United States Patent [19]

Deshazer et al.

[11] Patent Number: 4,923,222
[45] Date of Patent: May 8, 1990

[54] CASING SEALING APPARATUS

[76] Inventors: William A. Deshazer, 109 Brighton Dr., Lafayette, La. 70503; Robert J. Beck, 601 Mullins Rd.; Wilton L. Helveston, 4100 Pratt Dr., both of Iberia, La. 70560

[21] Appl. No.: 186,109
[22] Filed: Apr. 25, 1988
[51] Int. Cl.$^5$ .............................................. F16L 7/00
[52] U.S. Cl. ............................. 285/137.1; 285/131; 285/10; 285/47; 285/367; 405/184; 138/113
[58] Field of Search ............... 285/133.1, 45, 47, 131, 285/137.1, 367, 369, 417, 177, 178, 236, 10; 405/184; 138/113, 141

[56] References Cited

U.S. PATENT DOCUMENTS

| Re. 10,674 | 12/1885 | McCormick | 285/10 |
|---|---|---|---|
| 220,064 | 9/1879 | Evans | 285/10 |
| 317,408 | 5/1885 | Moeser | 285/10 |
| 329,405 | 10/1885 | McCormick | 285/10 |
| 335,467 | 2/1886 | McCormick | 285/10 |
| 400,532 | 4/1889 | Westinghouse, Jr. | 285/10 |
| 603,720 | 5/1898 | Avery | 285/10 |
| 2,084,224 | 6/1937 | Shaw | 285/45 |
| 2,196,766 | 4/1940 | Hasche | 285/10 |
| 2,428,652 | 10/1947 | Cole | 285/236 |
| 2,768,007 | 10/1956 | Brenner | 285/177 |
| 2,816,575 | 12/1957 | Stokes | 405/184 |
| 2,868,230 | 1/1959 | Stokes | 738/113 |
| 2,896,669 | 7/1959 | Broadway et al. | 285/133.1 |
| 3,773,087 | 11/1973 | Katayama | 285/236 |
| 3,774,403 | 11/1973 | Cushing | 405/184 |
| 4,180,101 | 12/1979 | Wegge | 138/113 |
| 4,452,277 | 6/1984 | Wells | 285/10 |

Primary Examiner—Randolph A. Reese
Assistant Examiner—Anthony Knight
Attorney, Agent, or Firm—Pravel, Gambrell, Hewitt, Kimball & Krieger

[57] ABSTRACT

A sealing plate, divided into a first upper section and a second lower section, the sealing plate having a bore therethrough slightly larger than the diameter of the casing around the internal pipe. There is further provided a attachment members on the wall of the upper and lower sections of the plate, for attaching the sections of the plate and allowing the sections of the plate to be drawn together around the casing by the attachment members. Further, there is provided a sealing gasket that spaced between the internal edge of the bore of the plates and the outer wall of the casing, so that as a plate member is attached, there is effected a fluid seal between the outer wall of the carrier pipe and the plate members through the sealing of the gasket member.

9 Claims, 3 Drawing Sheets

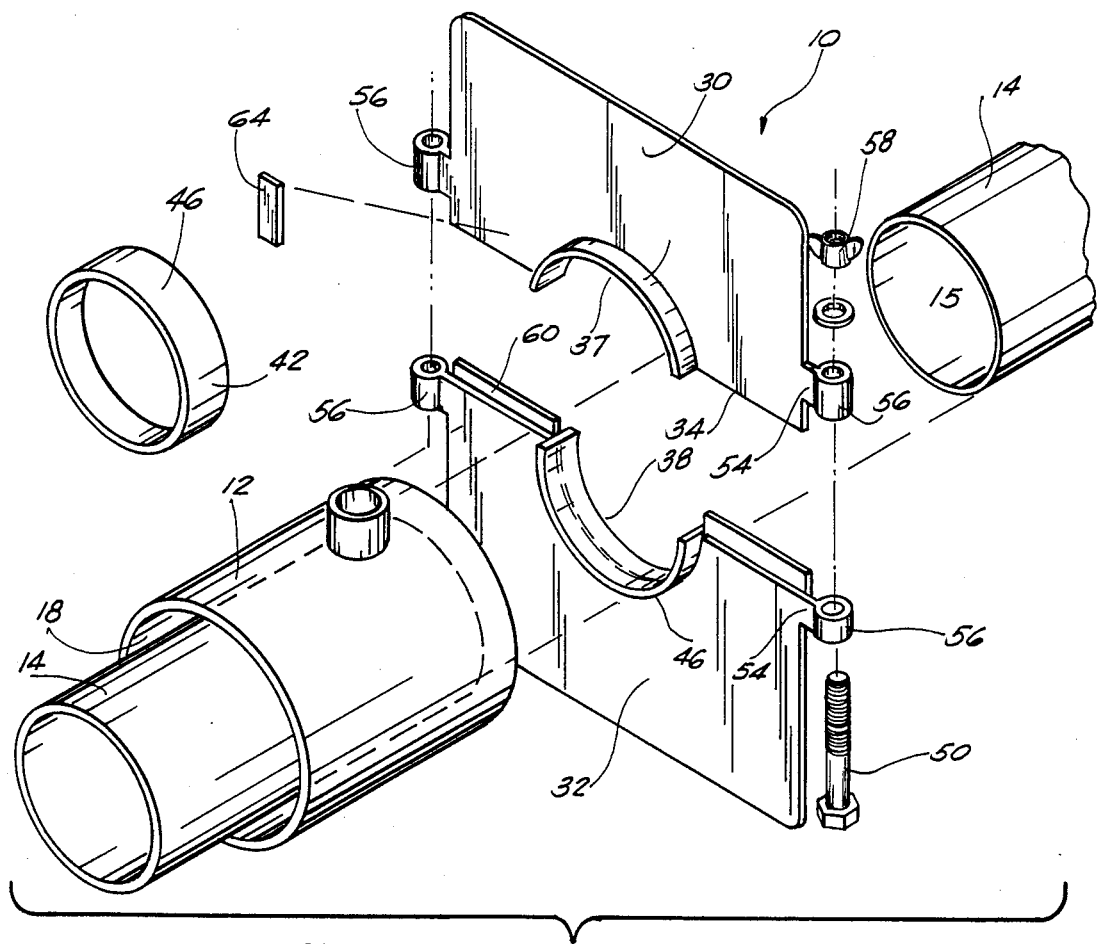
FIG. 1
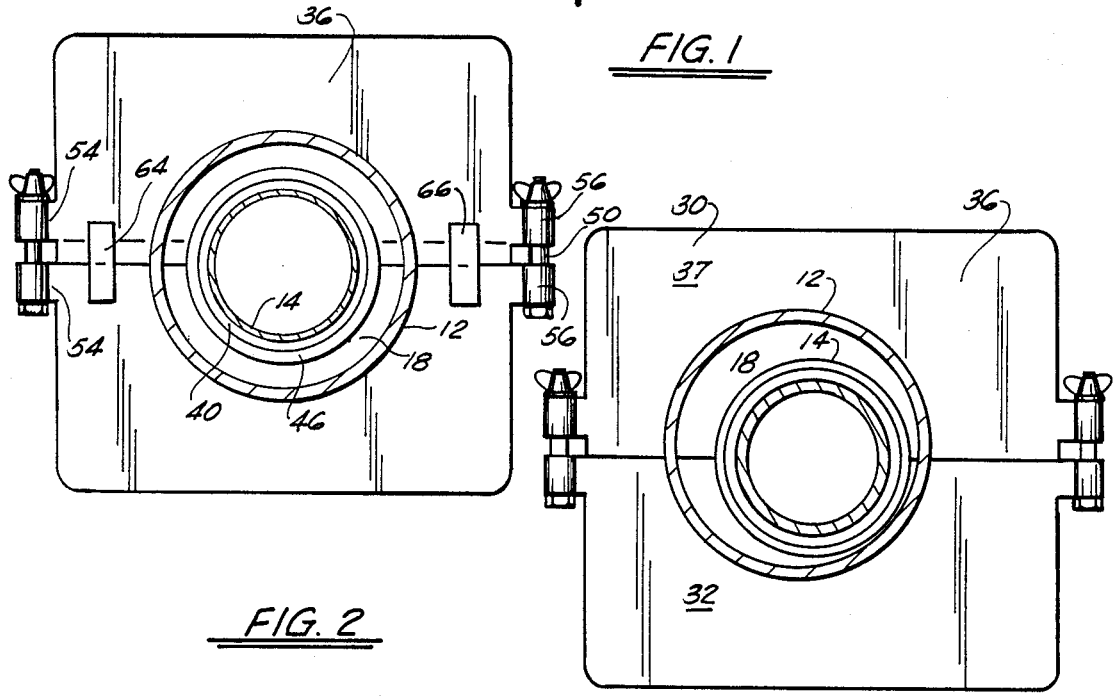
FIG. 2
FIG. 3

CASING SEALING APPARATUS

BACKGROUND OF THE INVENTION

1. Field of the Invention

The apparatus of the present invention relates to sealing the annulus between an internal carrier pipe and an external casing. More particularly, the apparatus of the present invention relates to a device for securing the two ends of a section of casing around an internal carrier pipe to provide a fluid seal within the annular space between a carrier pipe and a casing particularly suitable for underground crossings of pipelines.

2. General Background

In the construction of underground pipelines which are utilized for carrying natural gas or the like materials underground, a special consideration is given to safety in those sections of the pipeline that cross beneath public thorough fares such as highways or railroad crossings. In compliance with present regulations for these safety considerations, it necessary that the underground pipeline which carrying the natural gas be covered with a length of protective housing such as a casing along the entire length of the pipeline substantially the width of the public thoroughfare for the public safety. Following the placement of the carrier pipeline in the casing, the ends of the casing must be sealed off so that ground water or other extraneous materials cannot enter the annulus and also allow the filling of this annulus with a highly viscous fluid to eliminate corrosion of the carrier pipeline and therefore would prevent leaks from inadvertently occurring under ground which may of course result in a hazardous condition in the area of public thoroughfare.

In addition, in the event a section of pipeline should become corroded or the like, it may be necessary to remove that portion of the pipeline beneath the section of the thoroughfare, and therefore the outer casing must be replaced and resealed against the new section of pipeline.

One of the problems that is confronted in the placement of the protective casing around the inner carrier pipe is a problem of assuring that there is a fluid tight seal between the casing and the pipe. There have been various attempts to perfect this seal, and in the present state of the art all these attempts have fallen short. Particularly in the area when the pipeline must be replaced as opposed to the new construction. One of the more serious problems confronted is the fact that the carrier pipe is very often not centered and is not co-axially aligned with the external casing. Therefore, if one were to attempt to place a 'rubber boot' for example in the annulus between the pipeline and the casing in order to affect a seal, in view of the fact that the annulus is asymmetrical, it would be virtually impossible to create a proper seal continuously between all sides of the internal pipe and the internal surface of the casing. Therefore, there is much added expense, effort and safety hazards in order to finally achieve the results.

The apparatus of the present invention, in the preferred embodiment, would overcome all of the problems that have been confronted in the sealing of the casing and the internal carrier pipe, both in new construction and in the replacement of a section of pipeline.

Several patents have issued in regard to the sealing of pipes, the most pertinent being as follows:

| INVENTOR: | PATENT NO. | ISSUED: |
|---|---|---|
| A. J. Avery | 603,720 | May 10, 1898 |
| H. Moeser | 317,408 | May 5, 1885 |
| J. A. McCormick | 329,405 | October 27, 1885 |
| J. A. McCormick | RE 10,674 | December 15, 1885 |
| G. Westinghouse, Jr. | 400,532 | April 2, 1889 |
| J. A. McCormick | 335,467 | February 2, 1886 |
| R. L. Hasche | 2,196,766 | April 9, 1940 |
| O. B. Evans | 220,064 | September 30, 1879 |
| Roger F. Wells | 4,452,277 | June 5, 1984 |

SUMMARY OF THE PRESENT INVENTION

The apparatus of the present invention solves the problems in the art in a simple and straightforward manner. What is provided is a sealing plate, divided into a first upper section and a second lower section, the sealing plate having a bore therethrough slightly larger than the diameter of the casing around the internal pipe, the bore face including flange members to achieve a greater sealing surface around the bore. There is further provided attachment members on the wall of the upper and lower sections of the plate, for attaching the sections of the plate and allowing the sections of the plate to be drawn together around the casing by the attachment members. Further, there is provided a sealing gasket spaced between the internal face of the flange members and the plates and the outer wall of the casing, so that as plate members are secured together, there is effected a fluid seal between the outer wall of the carrier pipe and the plate members through the sealing of the gasket member.

Following the sealing of the plate members against the carrier pipe, the end of the external casing is permanently attached, through welding, to the backside of the plate, in order to effect the seal between the plate and the outer casing. This process is accomplished at each end of the casing to prevent ground water and extraneous materials entering the annulus and so that as fluid is pumped through a bore in the casing into the annulus between the casing and the internal carrier pipeline, none of the fluid pumped there through is allowed to escape due to the seal between the casing and the plate members Therefore, it is the principal object of the present invention to provide an apparatus for sealing an annular space between an internal carrier pipe and an external casing at a public thoroughfare crossing;

It is still a further object of the present invention to provide an apparatus which is sealably engaged to a carrier pipe, and to which a casing can be welded to the apparatus so that a seal is achieved between the apparatus and the carrier pipe;

It is still a further object of the present invention to provide an apparatus having a face plate sealably engaged against the wall of a carrier pipe, so that despite the alignment of the carrier pipe within an outer casing, the plates are of sufficient width to accommodate the end face of a casing sealably attaching, through welding or the like, to the face plate in order to effect a seal between the carrier pipe and the annulus between the carrier pipe and the casing;

It is still a further object of the present invention to provide an apparatus when installed is a structurally rigid unit that assists in supporting the carrier pipeline to maintain clearance between the casing and carrier pipeline;

It is still a further object of the present invention to provide a system which creates a positive pressure tight seal which prevents intrusion of ground water or other extraneous materials into the casing annulus and allows the annulus to be by filled by a viscous fluid which cannot leak out;

It is still a further object of the present invention to provide a system which provides electrical insulation between the cathodically protected carrier pipeline and the casing;

It is still a further object of the present invention to provide a system which provides structural support between the carrier pipeline and casing to maintain their clearance; and It is still a further object of the present invention to provide a system which allows sealing of the casing ends regardless of the eccentricity between the carrier pipeline and the casing.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 illustrates an overall exploded view of the preferred embodiment of the apparatus of the present invention;

FIG. 2 illustrates an end view of the preferred embodiment of the present invention with the internal carrier pipe coaxially aligned within the external casing;

FIG. 3 illustrates an end view of the present invention wherein the internal carrier pipe is misaligned within the external protective casing;

DETAILED DESCRIPTION OF THE PREFERRED EMBODIMENT

Figure 5:
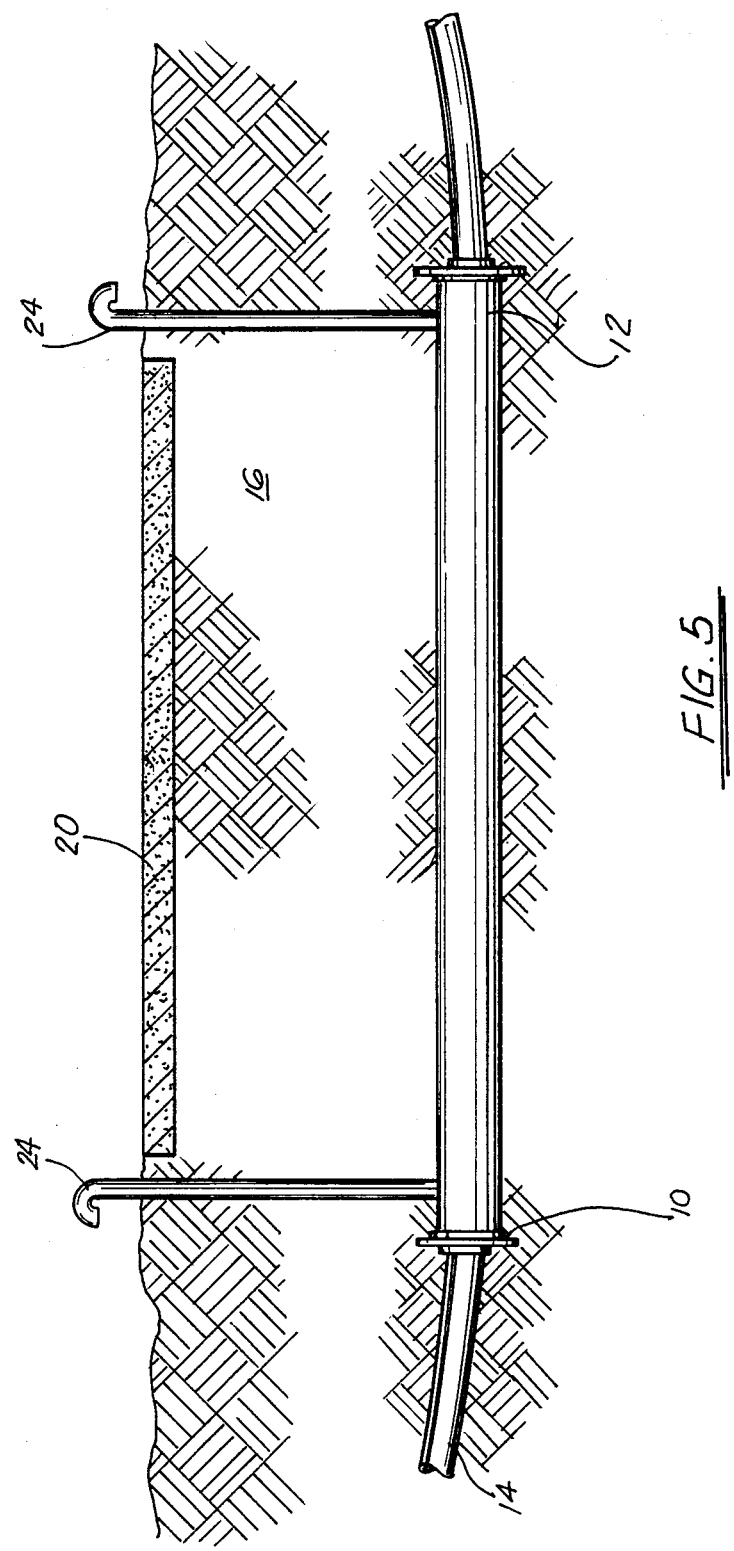
FIG. 5 illustrates an overall representational view of the preferred embodiment of the apparatus installed in a pipeline under a public thoroughfare such as a highway.

As seen in the FIGURES, and particularly in FIG. 5, a composite view of apparatus 10 is secured at each end of an outer length of casing 12 which is housed around a carrier pipe 14 of the type for carrying natural gas or the like underground, within the earth 16. Because the outer casing 12 is of larger diameter than internal carrier pipe 14 there is provided an annulus 18 between the internal wall of casing 12 in the outer wall of carrier pipe 14. In the preferred embodiment, following the placement of external casing 12 and sealing engagement on its ends by apparatus 10, will prevent intrusion of ground water and other extraneous materials and allow a viscous fluid to be pumped through a port provided in casing 12 and into annulus 18, in order to prevent corrosion of the carrier pipe 14. As is illustrated, in FIG. 5, a section of casing has been placed around carrier pipe 14 since it is crossing beneath a public thoroughfare such as a highway or the like 20. As illustrated further, there are a pair of vents 22 and 24 which extend from within the annulus 18 in order to vent any excess air or the like that may be trapped during the pumping of the fluid into the annulus 18, or gas in the event a leak occurs in the carrier pipe 14.

Turning now to FIGS. 1-4, there is illustrated the apparatus of the present invention as seen more clearly in FIG. 1 by the numeral 10. As seen in the FIGURE, as was discussed earlier, apparatus 10 would be secured around an internal carrier pipe 14 that would carry natural gas or the like through its interior bore 15, and there is also included an external casing 12 which would be of greater diameter than carrier pipe 14 and therefore would result in internal annulus 18 between the wall of carrier pipe 14 and the wall of outer casing 12. In the use of the apparatus 10 of the present invention, it is necessary that prior to the fluid being pumped through port 17 of casing 12 and to annulus 18, that there be affected a seal at the end 19 of casing 12, so that the fluid when being pumped under pressure does not escape out of the ends of casing 12, but fills the void within annulus 18.

As seen in the drawings, this is provided Forby the use of apparatus 10. Apparatus 10 would include a body portion comprised of an upper plate 30 and lower plate 32, flange plates 30 and 32 join together at a common edge 34 in order to form the composite sealing plate 36 as seen in FIGS. 2 and 3. As seen further in FIG. 1 each of the upper plates 30 and 32 would be provided with a semicircular bore 37 and 38 respectively so that when they are placed into the composite configuration 36, semicircular bores 37 and 38 affect a single bore 39, which would be a slightly greater diameter than the outer diameter of carrier pipe 14, upon which the composite plate 36 would be engaged. However, in order to perform a seal between carrier pipe 14 and plate members 30 and 32, there is provided a compression gasket 40 which would in the preferred embodiment be approximately one fourth inch in thickness and would be neoprene rubber, and in the preferred be embodiment three inches in width and having 65-70 durameter engagement. As seen in the FIGURES, gasket 40 would have an opened 42 for allowing the gasket to be opened and slipped around the wall of carrier pipe 14, with the gasket 40 being placed in position where the plate members 30 and 32 are joined together.

Further, in order to effect a more functional seal between the plate members 30 and 32 each of the plate members are provided with a compression backup ring 44 and 46 respectively, each ring welded along the internal surface of each of the semicircular ports 37 and 38, and each ring being substantially the same width as gasket 40. For purposes of construction, the rings would be of 16 gauge steel for pipeline diameters through 12 inches and would be $\frac{1}{8}$ inch thick steel for pipeline sizes 14 inches through 20 inches in diameter, and $\frac{1}{4}$ inch thick steel for pipeline sizes above 20 inches in diameter. Therefore, it is foreseen that various thicknesses of the rings would be required to accommodate the various pipe sizes. As the plate members 30 and 32 are positioned around the seal, thickness of the compression rings 44, 46 increases as the pipe size increases. Any pressure placed upon gasket 40 would be placed around the entire width of the gasket via sealing rings 44 and 46 in order to affect a tighter seal.

The gasket which provides the fluid tight seal around the carrier pipeline also provides electrical insulation between the casing and carrier pipeline. The carrier pipeline has an impressed electrical current for cathodic protection and must be electrically insulated from the casing.

Turning now to the means by which the plate members 30 and 32 are placed in sealing engagement, there is provided a pair of compression bolts 50 and 52 positioned along the side flange members 54 of body portions 30 and 32, and on the upper and lower portions of plate 30 and 32 there are provided a bolt guide 56 through which the length of bolts 50 and 52 slip therethrough as seen in FIGS. 2 and 3. Following the placement of the bolts through the bolt guides 56, a type of nut, such as a wing nut 58, as seen in the FIGURES, are threadably attached, and therefore as the wing nuts are tightened the members 30 and 32 are moved together and a greater seal is affected between gasket 40, the edges of plate member 36 and the wall of pipe 14.

In order to provide further for the provision that plate members 30 and 32 are not misaligned along there common edges 34, there is provided a pair of metal strips 60 and 62 along the front side of the edges in order to prevent the top edge of plate 30 from slipping behind plate 32. Likewise, there would be provided a pair of tabs 64 and 66 as seen in FIG. 2, welded onto the back face of plate 36 to assure that common edges 34 are maintained in alignment when the plates are forced into sealing engagement against pipe 14.

Figure 4:
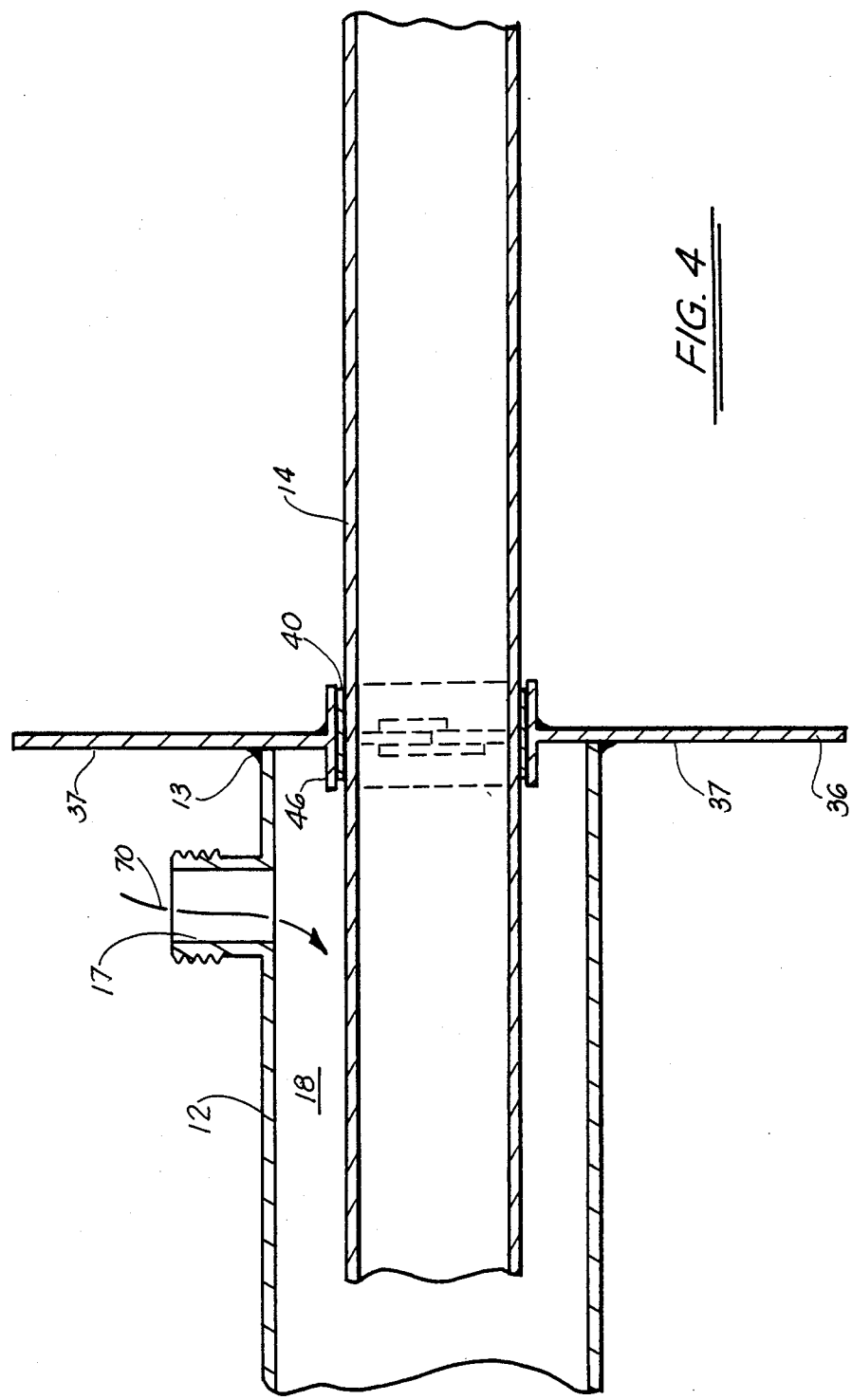
FIG. 4 illustrates a side, cross-sectional view of the preferred embodiment of the apparatus in sealing engagement between an external casing and an internal carrier pipe.

Following the sealing engagement of the plate member 36 against carrier pipe 14, the section of casing 12 is positioned with the end edge 19 up against the face 37 of plate 36. At that point there is a bead weld 13 effected between casing 12 and the outer face 37 of plate member 36. Therefore, it is assured that outer casing is welded to face 36. The internal carrier pipe is likewise provided with a fluid tight seal against the plate via the compression gasket 40 between the outer wall of pipe 14 and the compression ring 46. This sequence of steps are carried out on both ends of the length of casing 12. A bead weld is placed along the top of the metal strips 60 and 62 both front and exposed back sides and along the over lap portions of compression backup rings 44 and 46. Once it is in seal position as seen in FIG. 4, ground water and other extraneous materials cannot enter the annulus and a fluid can be pumped through port 17 in the direction of arrow 70, and the viscous fluid occupies annulus 18 between the internal pipe 14 and the outer casing 12 throughout the length of that portion of that portion of pipeline.

As stated earlier, FIG. 2 illustrates the positioning of the internal pipe 14 with the sealing gasket 40 between itself and the compression ring 46 showing annulus 18 between itself and the wall casing 12. This would be the type of alignment that would be obtained and one would be sealing, in most cases, in new construction. However, FIG. 3 is a type of misalignment between the internal pipe 14 and the external casing 12 which creates problems in the industry. If one were to attempt to position a sealing member within annulus 18 one can readily ascertain that the annulus is asymmetrical relative to the distance between the wall of pipe 14 and the wall of pipe 12. Therefore, the present invention has been arrived at to accommodate this problem.

As noted in the FIGURE, the carrier pipe 14 would always be sealably engaged within the composite annulus 39 defined by the hemispheres 37 and 38. Therefore, the dimensions of the wall of plates 30 and 32 surrounding the internal bore 39 would have to be such that despite the position of the casing relative to the internal pipe, there would be sufficient wall for welding the external casing against a portion of the wall of composite flange 36. Stated otherwise, if the internal pipe 14 were four inches in diameter, and the external casing 12 were eight inches in diameter, then even if the internal pipe 14 were aligned completely offset against one wall of casing 12, the maximum distance between the edge of the wall of the internal pipe 14 and the wall of the casing 12 would be an additional four inches. Therefore, one would have be assured that there would be at least four inches of wall of the composite flange 36 surrounding the bore 39 in order to be assured that the casing would have a welding point completely around its circumference and positioning it in place. This is clearly illustrated in FIG. 3 where the internal pipe 14 is centrally sealed within flange 36, yet casing 12 is asymmetrically welded onto the composite plate 36. However, there is sufficient face area of flange 36 to accommodate this offsetting between the internal pipe and the external casing.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for sealing off the annular space between an internal carrier pipe and both ends of a section of external casing, comprising:
    (a) a body portion comprising upper and lower half sections, each half section having a semicircular bore therethrough and defining a bore for housing the carrier pipe when the sections are connectedly engaged, wherein the face of the body portion provides adequate area for the permanent seal between the external casing and the body portion, even when the internal pipe is misaligned within the external casing;
    (b) means for connectedly engaging the upper and lower half sections of the body portion around the fall of the carrier pipe and for forcing the sections into sealing engagement against the wall of the carrier pipe;
    (c) sealing means interposed between the wall of the carrier pipe and the upper and lower sections of the half body portions for effecting a fluid-tight seal between the carrier pipe and the wall of the bore of the body portions at each end of the external casing when the sealing means is positioned in sealing engagement therewith; and
    (d) means for engaging each end of the external casing against the face of a body portion so that a permanent sealing engagement can be effected between the ends of the casing and each body portion.

2. The apparatus in claim 1, wherein there is further provided a compression ring secured within the bore of the body portion for increasing the sealing between the body portion and the carrier pipe through the sealing means.

3. The apparatus in claim 1, wherein the body upper and lower body portions are secured against the wall of the carrier pipe via a pair of bolt members engaging the body portions and forcing the upper and lower portions into sealing engagement around the carrier pipe.

4. A process for sealing the two ends of an outer casing secured around an internal carrier pipe so that fluid may be sealably housed in the annulus between the outer casing and the carrier pipe, the process including the following steps:

(a) providing upper and lower flange members, at each end of the outer casing, each of the flange members having a semicircular bore, the flange members securable around the fall of the internal carrier pipe for effecting an engagement thereupon, even in the event that the internal carrier pipe is misaligned within the annulus between the carrier pipe and the casing;

(b) providing a gasket member intermediate the wall of the body portions and the fall of the carrier pipe;

(c) providing means for positioning the upper and lower flange members against the wall of the carrier pipe so that a seal is affect-d between the flange members, the gasket members and the wall of the carrier pipe;

(d) positioning each end of the external casing against the face of the flange members; and (e) permanently securing through welding the end faces of the external casing to the faces of the flange members for effecting a permanent seal there against.

5. A process for sealing the end of an outer casing secured around an internal carrier pipe so that ground water and other extraneous mate rials are excluded from the annulus between the outer casing and the carrier pipe, the process including the following steps:

(a) providing upper and lower flange members, each of the flange members having a semicircular bore, the flange members securable around the wall of the internal carrier pipe for effecting an engagement thereupon and even in the event that the internal carrier pipe is misaligned within the annulus between the carrier pipe and the casing;

(b) providing a gasket member intermediate the wall of the body portions and the fall of the carrier pipe;

(c) providing means for positioning the upper and lower flange members against the fall of the carrier pipe so that a fluid-tight seal is affected between the flange mebers, the gasket members and the all of the carrier pipe;

(d) positioning an end of the external casing against the face of the flange members;

(e) permanently securing through welding the end face of the external casing to the face of the flange members for effecting a permanent seal; and (f) repeating steps a-e on a second end portion from the casing around the carrier pipe, so that fluids in the annular space between the carrier pipe and the casing are prevented from escaping the end fall of the casing, are fluids on the outside of the casing are prevented from entering into the annular space at the end fall of the casing.

6. The apparatus of claim 1, wherein a positive seal against the carrier pipe therein provides electrical insulation between the carrier pipe and the casing.

7. The apparatus of claim 1, wherein the face of the body portion is permanently secured to the casing by welding, providing structural support to the carrier pipe.

8. The process of claims 4 or 5, wherein a positive seal against the carrier pipe therein provides electrical insulation between the carrier pipe and the casing.

9. The process of claims 4 or 5, wherein the flange members are permanently secured to the casing by welding, providing structural support to the carrier pipe.

* * * * *